Nov. 8, 1927.                                                                                      1,648,202
G. H. STANGE
THEFT ALARM FOR AUTOMOBILES
Filed Jan. 27, 1926

Inventor
George H. Stange
Attorney

Patented Nov. 8, 1927.

1,648,202

UNITED STATES PATENT OFFICE.

GEORGE H. STANGE, OF PORTLAND, OREGON.

THEFT ALARM FOR AUTOMOBILES.

Application filed January 27, 1926. Serial No. 84,085.

My invention relates to a new and improved theft alarm for automobiles, the object of which is to provide a signal that may be set in action by the entrance to the automobile during the period of the same being set.

A further object of my invention consists in providing a signal wherein, if the front or rear bumper of the automobile, or either one of the same is contacted with, the signal will be set in motion and the same will automatically be released when the pressure or contact has been released, upon either of the bumpers upon which the signal is located.

A further object of my invention consists in providing within the box for the electric switches of simple and efficient means consisting of a hand actuator. The switch may be set by the application of a key within a lock disposed upon the case of the box in such a manner that the same may not be unlocked without the application of a key for the locking of the same.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:—

Like reference characters refer to like parts throughout the several views.

Figure 3:
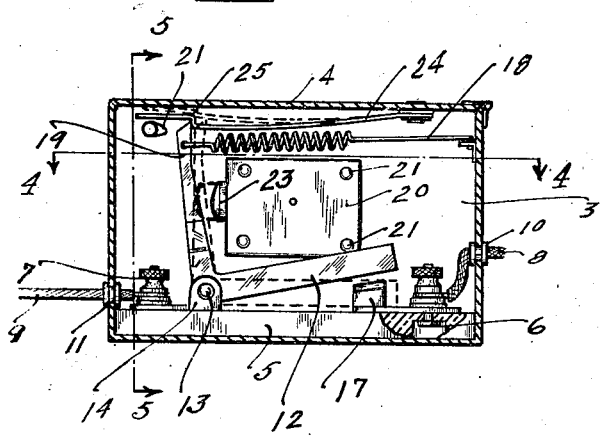
Fig. 3 is a cross section view, taken on line 3—3 of Fig. 2, looking in the direction indicated.
Figure 5:
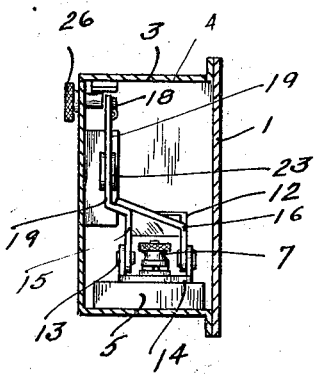
Fig. 5 is a cross section view, taken on line 5—5 of Fig. 3, looking in the direction indicated.
Figure 4:
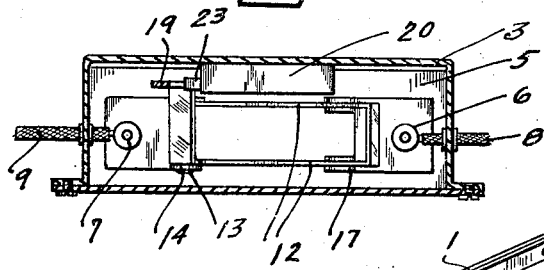
Fig. 4 is a cross section view, taken on line 4—4 of Fig. 3, looking in the direction indicated.
Figure 1:
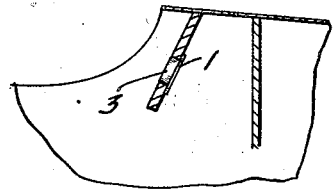
Fig. 1 is a fragmentary side elevation of an automobile, showing my device secured to the cowl.
Figure 2:
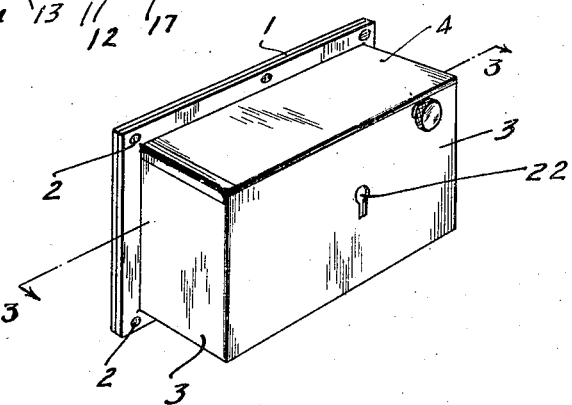
Fig. 2 is a perspective view of the box into which the switches and connections are placed and made, the same having a hinged lidded closure.

1 is the base of the box adapted to attachment to the automobile by suitable fastening means through holes 2, disposed within the base. A box like structure 3, is secured to the base having a hinged lidded closure 4, secured thereto. Disposed within the box is an insulated support 5, having binding posts 6 and 7, secured thereto for the admission into the box of the electric conduits 8 and 9. Insulators 10 and 11 being provided where the conduit passes through the wall of the box structure. A single throw switch 12, is journaled about a pin 13, disposed within the bracket 14, secured to the binding post 7. The switch is bifurcated, as shown at 15 and 16, in Fig. 5, and completes a connection of engagement with the electrical connection 17, secured to the binding post 6. The normal position of the switch is that of a closed switch, the same being held in a closed position through the action of spring 18, which is secured to the wall of the box on its one end and to the arm 19 of the switch on the other. A lock 20 is secured to the wall of the box and is secured thereto by suitable fastening means as screws or rivets 21. The plunger of the lock is adapted to be actuated by adaptation of a key to be inserted into the wall of the box, as shown at 22. This key actuates the plunger 23, disposed within the lock. A spring 24 is secured to the lidded closure of the box having an offset 25, disposed on the vibrating end of the spring and is in alignment and adapted to contact with the arm 19 of the switch and when so contacting therewith, as shown in the full line position of Fig. 3, the switch is maintained in an open position, but when released from contact with the offset 25, of the spring 24, the switch will be closed and the electric circuit will be closed. The switch is placed in the full line position, as shown in Fig. 3, by the action of the key that operates the plunger 23 within the lock, and opens the switch and causes the engagement of the arm 19 with the offset 25, of the spring 24. When the driver of the automobile desires to leave his car and leave the same in position to be protected, he turns the knob 26, disposed on the outside of the case of the box and in doing so the projection 27, disposed on the inside of the box engages with the spring 24 and lifts the same, thus relieving the arm 19 from contact with the offset 25, and the tension spring 18 will then close the circuit. The switch may be opened by the insertion of the key and the replacing of the arm 19 in contact with the offset 25 of the spring 24. Then the circuit is a closed circuit, in so far as the switch is concerned.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:—

1. In a theft alarm for automobiles, a box like structure adapted to be secured to the frame of a motor vehicle, an insulated support mounted within said box like structure, a knife switch mounted upon said insulated support, a spring normally maintaining said switch in a closed circuit position, a spring catch mounted upon the upper wall of said box retaining said switch in open circuit position, an operating knob revolubly mounted through the wall of said box, a projection on said knob, said projection to contact with said spring catch to permit said knife switch to be disengaged therefrom, and a lock mounted within said box, the bolt of said lock to contact with said switch and to move the same into engagement with said spring catch.

2. In a theft alarm for automobiles, a box like structure securable to the frame of a motor vehicle, an insulated support disposed within said boxlike structure, a knife switch mounted upon said insulated support, a spring normally maintaining switch in a closed circuit position, a spring catch mounted on the upper wall of said box, said catch engaging with an arm of said switch to maintain the same in an open circuit position, an operating knob revolubly mounted through the wall of said box, a projection on said knob, said projection to contact with said spring catch to permit said knife switch to be disengaged therefrom, and a lock mounted within said box, the bolt of said lock to contact with said switch to move the same into engagement with said spring catch.

3. In a theft alarm for automobiles a box disposed upon an automobile frame or body, provided with a switch normally maintained in a closed position, spring means for maintaining the switch in open position, a knob having a projection disposed upon the inner end thereof mounted within the wall structure of the box and adapted to register with the spring for normally maintaining the switch in open position, said knob when manually actuated, being adapted to release the switch from engagement with the spring for maintaining the same in open position, means for closing the switch and circuit upon the release of the spring from engagement with the switch and a lock mounted within the box adapted to key operation, a plunger within the lock adapted to register with the switch and when operated by the key to open the switch and the circuit.

GEORGE H. STANGE.